United States Patent Office 3,031,419
Patented Apr. 24, 1962

3,031,419
METHOD OF CATALYST MANUFACTURE
James Hoekstra, Evergreen Park, Ill., assignor to Universal Oil Products Company, Des Plaines, Ill., a corporation of Delaware
No Drawing. Filed July 20, 1959, Ser. No. 828,059
18 Claims. (Cl. 252—442)

This invention relates to a method for manufacturing catalysts and particularly to a method for the manufacture of catalysts comprising calcined composites of a Friedel-Crafts metal halide and a composite of a refractory oxide containing a hydrogenation component in a reduced valence state. More particularly the present invention relates to a method for manufacturing a catalyst comprising a calcined composite of a Friedel-Crafts metal halide and a composite of a refractory metal oxide containing a platinum group metal in the valence state of zero.

Friedel-Crafts metal halide containing catalysts and various methods for manufacturing the same have heretofore been suggested. These catalysts, while of wide commercial applicability, have been rather scarcely used inasmuch as said catalysts are possessed of relatively short lives and difficultly controllable activity. Therefore, the present invention is based upon the discovery that particularly high activity catalysts, possessing long, useful lives, may be prepared by the specific methods of preparation hereinafter described in detail.

One such reason for a relatively short life of a catalyst of the type hereinafter set forth is the presence of water in the refractory oxide-platinum group metal composite, said water tending to contaminate the catalyst by hydrolyzing the aluminum chloride with which the composite is treated in a subsequent step. Therefore, it is an object of this invention to provide a process or method for the manufacture of a catalyst which will not be contaminated by water.

A further object of this invention is to pretreat a refractory oxide-platinum group metal composite with a hydrochloride to remove any water which may still be present before treating said composite with a Friedel-Crafts metal halide.

One embodiment of this invention resides in a method for manufacturing a catalyst which comprises treating a composite of a refractory oxide containing a platinum group metal, the platinum group metal being characterized by being in a reduced valence state, with a hydrohalide, thereafter vaporizing a Friedel-Crafts metal halide onto said composite and heating the thus formed composite at a temperature above 400° C. for a time sufficient to remove therefrom any unreacted Friedel-Crafts metal halide.

Another embodiment of this invention is found in a method for manufacturing a catalyst which comprises treating a composite of a refractory metal oxide containing a platinum group metal, the platinum group metal being characterized by being in a reduced valence state, with a hydrohalide, thereafter vaporizing a Friedel-Crafts metal halide onto said composite and heating the thus formed composite at a temperature in the range of from about 400° to about 700° C. for a time sufficient to remove therefrom any unreacted Friedel-Crafts metal halide.

Yet another embodiment of the invention resides in a method for manufacturing a catalyst which comprises treating a composite of a refractory metal oxide containing platinum metal, the platinum metal being characterized by being in a reduced valence state, with a hydrohalide, thereafter vaporizing a Friedel-Crafts metal halide onto said composite and heating the thus formed composite at a temperature in the range of from about 400° to about 700° C. for a time of from about 1 to about 48 hours to remove therefrom any unreacted Friedel-Crafts metal halide.

A specific embodiment of the invention resides in a method for manufacturing a catalyst which comprises treating a composite of alumina containing platinum metal, the platinum metal being characterized by being in a reduced valence state, with hydrogen chloride at a temperature in the range of from about 500° to about 650° C., thereafter vaporizing a Friedel-Crafts metal halide onto said composite and heating the thus formed composite at a temperature in the range of from about 400° to about 700° C. for a time of from about 1 to about 48 hours to remove therefrom any unreacted Friedel-Crafts metal halide.

A more specific embodiment of the invention is found in a method for manufacturing a catalyst which comprises treating a composite of alumina containing platinum with a hydrogen-containing gas at conditions to convert the platinum to a reduced valence state, thereafter treating said composite with hydrogen chloride and hydrogen at a temperature in the range of from about 500° to about 650° C. and contacting vapors of aluminum chloride with said composite at a temperature of from about 400° to about 700° C. for a time of from about 1 to about 48 hours, whereby simultaneous reaction of the aluminum chloride with said composite and heating of the resultant composite to remove unreacted aluminum chloride is accomplished as a single step.

Other objects and embodiments will be found in the following further detailed description of the invention.

As hereinbefore set forth, it has been found that catalysts of exceptionally high activity and long life may be prepared in accordance with the novel features of the present invention. While the catalysts, in one stage of their preparation, are prepared from Friedel-Crafts metal halides, they do not contain free Friedel-Crafts metal halide as prior art catalysts of this general type have contained. In the preparation of the catalysts of the present invention, the refractory oxide containing a hydrogenation component, after pretreatment with a hydrogen halide and, if so desired, hydrogen, and after vaporization thereon of a Friedel-Crafts metal halide and simultaneously or subsequently heating the composite, will be increased in weight by from about 2 to about 10% based on the original weight of the refractory oxide containing a hydrogenation component. While the exact increase in weight of the refractory oxide containing a hydrogenation component does not appear to be critical within the above-mentioned range, it has been found that highly active catalysts are obtained when the thus treated refractory oxide has been increased in weight from about 4 to about 8%. As stated hereinabove, the present catalytic composites are prepared from a Friedel-Crafts metal halide but do not contain, after preparation, any free Friedel-Crafts metal halide. During the preparation and simultaneous or subsequent heating, the Friedel-Crafts metal halide appears to react with the refractory oxide containing a hydrogenation component. The simultaneous or subsequent heating treatment is carried out at a temperature above that required for vaporization of any free Friedel-Crafts metal halide from the surface of the catalyst at the conditions utilized. This and other features of the present invention will be set forth hereinafter in detail.

In the first step of the process of the present invention a hydrogenation component, and particularly a metal of the platinum group, is incorporated into a refractory oxide. As will be shown hereinafter in detail, hydrogenation components are incorporated into refractory oxides by various techniques including impregnation, coprecipitation, precipitation, decomposition, etc. In these various techniques for the incorporation of a hydrogenation component, particularly a platinum group metal, into or onto a refractory oxide such as alumina, the finished composite of refractory oxide and hydrogenation component is usually calcined in air to fix the hydrogenation component and very often to dry the refractory oxide thereby simultaneously accomplishing a development in the surface area thereof. Concurrently with the fixing of the hydrogenation component and the drying of the refractory oxide, some oxidation of the metallic hydrogenation component usually takes place. Thus, some or all of the hydrogenation component may actually be in the form of metal oxides in which the metal occurs in various positive valence states. These metal oxides are particularly susceptible to removal from combinations with a refractory oxide by the passage thereover of a Friedel-Crafts metal halide such as aluminum chloride. For example, it has been found that oxides of platinum are readily stripped from combination with alumina by the passage of aluminum chloride vapors thereover. Therefore, it is necessary when utilizing such a composite of a refractory oxide containing a hydrogenation component to insure that the hydrogenation component is in a reduced valence state prior to vaporization of a Friedel-Crafts metal halide thereon. This can readily be carried out by the passage thereover of a hydrogen-containing gas, for example, hydrogen or hydrogen diluted with various inert gases, at conditions at which reduction of the metal oxides of the hydrogenation component take place. In this reduced valence state the average valence of the metal will be in the range of from 0 to about 0.5, more particularly the average valence of the metal being from about 0.1 to about 0.2. These conditions will vary over a relatively wide range depending upon the particular hydrogenation component in combination with the refractory oxide and may include temperatures of from about 250° to about 700° C. or more and pressures ranging from about atmospheric to about 100 atmospheres or more, the higher pressures usually being associated with the lower temperatures and vice versa. The times necessary for such treatments will depend upon whether batch or continuous methods of operation are employed and will further depend upon the quantity of metal oxide and the hydrogenation component present. In a continuous type operation it has been found that the reduction of the hydrogenation component can be satisfactorily measured by carrying out the hydrogenation at hydrogenation conditions until no more water is removed from the hydrogenation zone. As set forth hereinabove, this necessity for the hydrogenation component being in the reduced valence state is particularly critical when the hydrogenation component is a platinum group metal, particularly platinum. Platinum can be found in various oxidation states in which the platinum occurs in various positive valences. Apparently, platinum in any positive valence state is readily stripped from a composite with alumina by the passage of aluminum chloride thereover. Therefore, it is necessary when utilizing a platinum group metal, particularly platinum, as the hydrogenation component in combination with a refractory oxide, such as alumina, as the starting material in this process, to reduce the platinum so that the platinum is in a metallic state characterized by a reduced valence. Therefore, in accordance with the teaching set forth hereinabove, the hydrogenation component associated with the refractory oxide must be in a reduced valence state, before the composite of refractory oxide containing a hydrogenation component can be satisfactorily utilized as the starting material in the process of this invention.

Following the reduction of the hydrogenation component in the catalyst to a reduced valence state the catalyst composite is contacted with a gaseous hydrogen halide and preferably gaseous hydrogen chloride or hydrogen bromide. The composite is contacted with the hydrogen halide at a temperature approximately the same as that used in the other steps of the process and preferably in a range of from about 500° to about 650° C., although higher or lower temperatures may also be used. The amount of hydrogen halide which is used in the treatment of the composite is dependent upon the surface area of the particular refractory oxide which is used, an excess of hydrogen halide over the surface area of the composite being preferred. In addition, if so desired, the hydrogen halide addition is also accompanied by the presence of hydrogen or an inert gas such as nitrogen. The pretreatment of the composite with hydrogen halide will split out any water which may still be present on the composite and thus will prevent the contamination of the finished catalyst by the water. The presence of water on the finished catalyst will tend to hydrolyze the Friedel-Crafts metal halide such as aluminum chloride which is added in a subsequent step, first forming aluminum oxychloride and ultimately aluminum hydroxide, thus rendering the metal halide inactive.

Following the pretreatment of the refractory oxide-hydrogenation component composite with the hydrogen halide and hydrogen, a Friedel-Crafts metal halide is added to the composite. The amount of Friedel-Crafts metal halide utilized will range from about 5% to about 50% based on the weight of the refractory oxide containing a hydrogenation component, this amount depending upon the exact method of preparation. For example, if a batch type of vaporization method is utilized, about two times as much Friedel-Crafts metal halide per amount of refractory oxide containing a reduced hydrogenation component is used as is desired as weight increase in the final composite. In a continuous vaporization procedure, this amount can be lowered to one which is just slightly greater than the desired net weight increase of the final composite. It is obvious that this amount, in any case, is not critical and may be varied to arrive at the active catalyst resulting therefrom depending upon the method of preparation and the temperature at which the composite is heated. Various Friedel-Crafts metal halides may be utilized but not necessarily with equivalent results. Examples of such Friedel-Crafts metal halides include aluminum bromide, aluminum chloride, antimony pentachloride, beryllium bromide, beryllium chloride, ferric bromide, ferric chloride, gallium trichloride, stannic bromide, stannic chloride, titanium tetrabromide, titanium tetrachloride, zinc bromide, zinc chloride, and zirconium chloride. Of these Friedel-Crafts metal halides, the Friedel-Crafts aluminum halides are preferred, and aluminum chloride is particularly preferred. This is so, not only because of the ease in operation in preparing the highly active catalysts in accordance with the process of this invention, but also because the thus prepared catalysts have unexpectedly high activity.

In accordance with the present process, one or more of these Friedel-Crafts metal halides are vaporized onto a refractory oxide containing a reduced hydrogenation component. Suitable refractory oxides include such substances as silica (a non-metallic refractory oxide), and various refractory metal oxides such as alumina, titanium dioxide, zirconium dioxide, chromia, zinc oxide, silica alumina, silica magnesia, silica alumina magnesia, chromia alumina, alumina boria, silica zirconia, and various naturally occurring refractory oxides of various states of purity such as bauxite, kaolin or bentonite clay (which may or may not be acid treated), diatomaceous earth such as kieselguhr, montmorillonite, spinels such as magnesium oxide-alumina spinels or zinc oxide-spinels, etc. Of the above mentioned refractory oxides, alumina is preferred and synthetically prepared gamma-alumina of a high degree of purity is particularly preferred.

The above mentioned refractory oxides have deposited therewith a hydrogenation component prior to pretreatment with a hydrogen halide and the vaporization thereon of the Friedel-Crafts metal halide. Methods for such compositing of the hydrogenation component with the refractory oxide are well known to those skilled in the art and include impregnation by means of aqueous or non-aqueous solutions of salts of the hydrogenation component, coprecipitation, etc., followed by drying and calcination. Suitable hydrogenation components include the metals of group VI–B and group VIII of the periodic table including chromium, molybdenum, tungsten, iron, cobalt, nickel, ruthenium, rhodium, palladium, osmium, iridium, and platinum. Of these hydrogenation components, the platinum group metals are preferred, and of these platinum group metals, platinum and palladium are particularly preferred. These metals are not necessarily equivalent in the resulting catalysts and of all hydrogenation components, platinum is particularly preferred. As set forth hereinabove, in combination with the refractory oxide, the hydrogenation component must be in a reduced state. Such reduced states in the case of the platinum group metals, particularly platinum, can be characterized by the hydrogenation component being in the valence state of zero, that is, metallic form.

In carrying out the present process following the pretreatment of the composite with a hydrogen halide and, if so desired, hydrogen, the temperature at which the Friedel-Crafts metal halide is vaporized onto the refractory oxide containing a hydrogenation component will vary in accordance with the particular Friedel-Crafts metal halide utilized. In some cases, since the Friedel-Crafts metal halide decomposes on heating to elevated temperatures, it may be necessary to carry out such vaporization at reduced pressure to preclude such decomposition. However, in most instances, the vaporization is carried out either at the boiling point or sublimation point of the particular Friedel-Crafts metal halide or at temperatures not greatly exceeding these points, for example, not greater than 100° C. higher than the boiling point or sublimation point of the Friedel-Crafts metal halide utilized. However, in some instances it may be desirable to carry out the vaporization and subsequent heating step at the same temperature and thus, such temperatures are also within the generally broad scope of the present invention.

This invention can perhaps be best understood by a description of a specific embodiment thereof. As set forth hereinabove, a particularly preferred refractory oxide for use in preparing the desired catalysts is alumina. Furthermore, the alumina is preferably prepared synthetically and is of a high degree of purity. The methods of preparation of such synthetic aluminas are well known. For example, they may be prepared by the calcination of alumina gels which commonly are formed by adding a suitable reagent such as ammonium hydroxide, ammonium carbonate, etc., to a salt of aluminum such as aluminum chloride, aluminum nitrate, aluminum sulfate, in an amount to form aluminum hydroxide which is converted to alumina upon drying. It has been found that aluminum chloride generally is preferred as the aluminum salt, not only for convenience in subsequent washing and filtering procedures but also because it appears to give the best results. Alumina gels are also prepared by the reaction of sodium aluminate with a suitable acidic reagent to cause precipitation thereof with the resultant formation of an aluminum hydroxide gel. Synthetic aluminas may also be prepared by the formation of alumina sols, for example, by the reaction of metallic aluminum with hydrochloric acid, which sols can be gelled by suitable precipitation agents such as ammonium hydroxide, followed by drying and calcination. In another embodiment, these synthetically prepared aluminas may contain from about 0.01% to about 8% combined halogen, preferably fluorine. These halogenated aluminas may be prepared in various manners, for example, by the addition of a suitable quantity of hydrofluoric acid to an alumina gel prior to drying and calcination thereof. In another manner, aluminum fluoride can be added to alumina gels thus yielding alumina having the desired quantity of halogen combined therewith. When the synthetically prepared alumina is prepared from aluminum chloride, it is sometimes advantageous and/or desirable to minimize the washings thereof to control the desired amount of chlorine composited with the alumina. In any of the above instances wherein the alumina is prepared from an alumina sol or an alumina gel, the resultant product is calcined to a sufficient temperature to convert the product into gamma-alumina. While the resultant aluminas may contain relatively small amounts of water of hydration, gamma-alumina with or without combined halogen is the preferred synthetically prepared alumina for use as the refractory oxide in the process of the present invention.

As hereinabove set forth, the above synthetically prepared alumina will have a hydrogenation component combined therewith, preferably a platinum group metal, and particularly platinum. This platinum group metal, particularly platinum, may be composited with the alumina in any of many well known manners. For example, an ammoniacal solution of chloroplatinic acid may be admixed with the alumina followed by drying. In another method, chloroplatinic acid in the desired quantity can be added to an alumina gel slurry followed by precipitation of platinum therefrom on the alumina by means of hydrogen sulfide or other sulfiding or precipitation agents. While the quantity of platinum combined with the alumina is not critical, for economic reasons, the amount of platinum is usually kept at a minimum. Thus, large amounts of platinum do not cause detrimental effects. Generally, however, it is preferred to utilize from about 0.01% to about 2% by weight of platinum based on the dry alumina. In another embodiment, the alumina and platinum can be composited by coprecipitation techniques. In such a case, an aqueous solution of the desired amount of platinum salt is admixed with a solution of an aluminum salt followed by the addition thereto of a precipitating agent which will cause coprecipitation. The resultant gel can be dried and calcined to form a gamma-alumina platinum composite which can be formed into the desired size particles.

While the physical form of the refractory oxide containing a reduced hydrogenation component is not critical, generally it is preferred to utilize macro particles so that the final composite may be used as a fixed bed in a reaction zone. Thus, it is desirable to form the synthetically prepared alumina, with or without the platinum group metal in the valence state of zero composited therewith, into pellets, for example, of $\frac{1}{16}''$ x $\frac{1}{16}''$ or $\frac{1}{8}''$ x $\frac{1}{8}''$, etc. This can be accomplished readily by grinding the dried alumina gel to a powder followed by gelling thereof by known methods. Alternatively, the particles may be in the form of spheres, or irregularly shaped particles such as result from extrusion. While it is not intended to limit the invention to particles of any particular size, the above mentioned alumina-platinum group metal composites are definitely preferred.

In carrying out one embodiment of the present process, the above described alumina-platinum composites in which the platinum is in a reduced valence state is pretreated before the addition of aluminum chloride by passing anhydrous hydrogen chloride and hydrogen over said composites at a temperature of about 600° C. whereby any water still present on the composite is swept off and out of the composite. Following this the composites have vaporized thereon aluminum chloride. This can be accomplished readily by sublimation of the aluminum chloride onto the surface of the particles. Aluminum chloride sublimes at 178° C. and thus a suitable vaporization temperature will range from about 180° to about 275° C. The sublimation may be carried out under pressure if desired and also in the presence of diluents such as inert gases including paraffin hydrocarbons, hydrogen, and nitrogen, but excluding air and other oxidizing gases. The amount of aluminum chloride which sublimes onto the above described particles reaches a maximum at any particular vaporization temperature selected. In addition to vaporizing onto the alumina-platinum composite, the aluminum chloride also reacts therewith evolving hydrogen chloride. However, it is difficult to control the exact amount of aluminum chloride which reacts. Therefore, to insure freedom of the resultant composite from free aluminum chloride and to insure the development of maximum catalytic activity, the composite is heated at a temperature above about 400° C. for a sufficient time to remove therefrom any unreacted aluminum chloride. Since aluminum chloride sublimes at 178° C., this heating treatment in the absence of further added aluminum chloride results in freeing the composite from free aluminum chloride. However, since aluminum chloride itself is tenaciously held onto an aluminum surface, temperatures at least as high as 300° C. are required. When the composite is further heated at a temperature above 400° C., maximum catalytic activity is developed as will be set forth further hereinafter. This high temperature (above 400° C.) heating treatment may accomplish further reaction of the unreacted aluminum chloride with the alumina-platinum composite thereby insuring freedom of the resultant composite from unreacted aluminum chloride. In some cases, if the aforementioned pretreatment is omitted the hydrogen chloride evolution is preceded by evolution of water. The hydrogen chloride evolution is thought to be due to the reaction of aluminum chloride with hydroxyl groups on the alumina surface. A portion of this hydrogen chloride can react with hydroxyl groups, thus freeing water. As hereinbefore set forth the presence of water can contaminate the composite, thus lowering the activity of the finished catalyst and shortening the life thereof. However, the final catalyst composite is free from free aluminum chloride and it is the process of the present invention which results in the unusual catalytic properties of the resultant composite. One unusual feature of catalysts which are prepared in the above described manner is that these catalysts may be utilized for reactions for which it has heretofore been considered necessary to use large amount sof hydrogen halide promoters along with free Friedel-Crafts metal halides such as aluminum chloride. While the use of hydrogen halide promoters with the catalyst compositions of the present invention is not meant to be excluded, it has been found unnecessary to utilize them in such large quantities and in some cases in any quantity to obtain satisfactory results from these compositions.

As set forth hereinabove, the composite of refractory oxide containing a reduced hydrogenation component and Friedel-Crafts metal halide is heated at a temperature above about 400° C. for a time sufficient to remove therefrom any unreacted Friedel-Crafts metal halide. The exact temperature to be utilized will depend upon the boiling point or sublimation temperature of the particular Friedel-Crafts metal halide utilized. In general, particularly with aluminum chloride, temperatures of about 400° to about 700° C. in times of from about 1 to about 48 hours are satisfactory. Furthermore, the refractory oxides containing hydrogenation components in a reduced valence state as set forth hereinabove are selected as substances suitable as catalyst supports for various reasons. One reason is that these substances, such as an alumina-platinum composite in which the platinum is in a reduced valence state, have high surface areas which appear to have a beneficial effect upon catalyst activity. In many cases, these high surface areas are developed in the preparation of such supports under carefully controlled conditions of heating at specific temperatures for specific periods of time. Therefore, in the heating process step of the present invention, whether carried out simultaneously or subsequently to the vaporization of the Friedel-Crafts metal halide, care must be taken so that these high surface areas are not destroyed by the aforementioned heat treatment. Therefore, it is definitely disadvantageous to carry out such heat treatments at temperatures above about 700° C. Of course, it is obvious that such temperatures are inter-related with the time at which such refractory oxides containing reduced hydrogenation components are kept at these temperatures. Therefore, care is asserted in all instances to maintain maximum surface area during the subsequent heating of the catalyst composites in the process of the present invention.

As set forth hereinbefore with reference to the vaporization of the Friedel-Crafts metal halide onto the composite of a refractory metal oxide containing a reduced hydrogenation component, the heating step can be carried out in the presence of various inert diluent gases. Such gases include methane, hydrogen, and paraffinic hydrocarbons including methane, ethane, etc. These gases do not have an adverse effect on the resultant catalyst activity. Furthermore, they do not allow oxidation of the hydrogenation component so that stripping thereof as set forth hereinabove from the composite can be accomplished by the passage of the Friedel-Crafts metal halide thereover. When the vaporization step and the heating step are combined, one or more of the above gases may be utilized as the carrier gas for the Friedel-Crafts metal halide as well as providing a proper atmosphere for the heating step. The use of this simultaneous vaporization and heating technique as well as the two step vaporization and subsequent heating technique method of preparation will be illustrated fully in the examples.

Furthermore, as will be demonstrated in the examples, this simultaneous or subsequent heating step results in catalyst composites of unexpectedly high activity for certain hydrocarbon conversion reactions. Thus, the catalysts formed in accordance with the process of the present invention are superior to composites comprising refractory oxides and free Friedel-Crafts metal halides. Furthermore, as set forth hereinabove, the vaporization and heating steps can be carried out simultaneously in a one-step process if so desired. For example, a suitable gamma-alumina platinum composite may be placed in a glass or steel tube in a furnace, the composite may then be pretreated with hydrogen chloride and hydrogen, following which the furnace is brought to the desired heating temperature and vapors of the Friedel-Crafts metal halide such as aluminum chloride passed thereover. The preparation of such a composite will be set forth in further detail in the examples.

The catalysts prepared in accordance with the present method may be utilized for effecting various reactions of organic compounds and particularly of hydrocarbons. These reactions include (A) condensation reactions in which two molecules, which may be the same or different, will condense to form larger size molecules, (B) destructive reactions in which a molecule is decomposed into a smaller size molecule or into two or more molecules, (C) rearrangement reactions as, for example, isomerization, (D) disproportionation reactions in which a radical is transferred from one molecule to another, (E) hydrogenation reactions, and (F) other reactions. Among these reactions are (1) polymerization of olefins and particularly of ethylene, propylene, 1-butene, 2-butene, isobutylene, amylene, and higher boiling olefins and mixtures thereof, (2) alkylation of isoparaffins with olefins or other alkylating agents including, for example, alkyl halides, etc., and particularly the alkylation of isobutane, isopentane, and/or isohexane with ethylene, propylene, 1-butene, 2-butene, isobutylene, amylene, etc., or mixtures thereof, (3) alkylation of aromatics with olefins or other alkylating agents, and particularly the alkylation of benzene, toluene, etc., with propylene, butylene, amylene, and higher boiling olefins, including nonenes, decenes, undecenes, dodecenes, tridecenes, tetradecenes, pentadecenes, etc., or mixtures thereof, (4) isomerization of paraffins and particularly of n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,3- and 2,2-dimethylbutane, (5) isomerization of naphthenes, for example, the isomerization of methylcyclopentane to cyclohexane, isomerization of dimethylcyclopentane to methylcyclohexane, (6) alkylation of phenols or thiophenols with olefins or other alkylating agents, (7) alkylation of thiophenes with olefins, (8) hydrogen transfer reactions, (9) alkyl transfer reactions, (10) dealkylation reactions, (11) reforming of gasolines or naphtha to improve the antiknock characteristics thereof, (12) destructive hydrogenation reactions, (13) cracking of oil heavier than gasoline into lower boiling products and particularly gasoline, including cracking under hydrogen pressure, (14) hydrogenation reactions in which an unsaturated compound is hydrogenated to a more saturated compound, for example, the hydrogenation of diolefins to olefins, olefins to paraffins, cycloolefins to naphthenes, etc., and (15) other reactions of hydrocarbons and organic compounds. The operating conditions to be employed will depend upon the particular reaction and generally will be at relatively low temperatures although higher temperatures may be employed, particularly with atmospheric pressure. Thus, the temperature may range from 0° C. or less to 300° C. or more, preferably from 25° C. to 250° C. and the pressure may range from atmospheric to 5000 p.s.i. or more, preferably from 50 p.s.i. to about 1000 p.s.i. Hydrogen may be employed when required or of advantage. It is believed that hydrogen in controlled amounts may play an important role in suppressing sludge formation and in promoting many of the reactions discussed above.

The process may be effected in any suitable manner, which will not only depend upon the particular reaction but also upon the form in which the catalyst is used. When the catalyst is utilized as a solid mass, it may be disposed as a fixed bed in a reaction zone, and the reactants are supplied thereto in any suitable manner. Reactants may be passed in upward flow or downflow through the catalyst bed. In another manner, the catalyst may be utilized in a so-called fluidized fixed bed type of operation in which the catalyst is maintained in a turbulent state by passage of the reactants therethrough. In another method of operation, the catalyst may be utilized as particles of suitable size so that they will be fluidized along with the reactants and passed to a reaction zone from which the catalyst is continuously separated from the reaction products. In any case, as hereinbefore set forth, the catalyst may be further activated, if desired, by the utilization therewith of a hydrogen halide such as hydrogen chloride or hydrogen bromide. In another embodiment, the hydrogen halide may be introduced in the form of a suitable organic compound such as an alkyl halide from which the hydrogen halide is formed under the reaction conditions. Examples of such alkyl halides including propyl chloride, butyl chloride, amyl chloride, propyl bromide, butyl bromide, amyl bromide, etc. Also, it is within the scope of the present invention to utilize the hydrogen halide promoter continuously or intermittently as may be desired in any particular case. Regardless of the particular operation employed, the products are fractionated or otherwise separated to recover the desired products and to separate unconverted material for recycling. Hydrogen halide in the effluent product likewise is separated and may be recycled if desired.

The following examples, which are given to illustrate further the novelty and utility of the present invention are not, however, intended to limit the generally broad scope of the present invention in strict accordance therewith.

*Example I*

Gamma-alumina was prepared by the general method of dissolving aluminum pellets in hydrochloric acid to form a sol containing 15% alumina. Hydrofluoric acid was added to the sol so that the final composite contained 0.375% fluorine by weight based on dry alumina. The resulting solution was mixed with hexamethylene tetramine in a continuous mixer and dropped into an oil bath at about 90° C. to form spheres. The spheres were aged in the oil, and then in an aqueous solution of ammonia for about one to two hours. The washed spheres were then transferred to a drier, dried at about 250° C., and calcined at about 600° C.

A sufficient quantity of the synthetically prepared gamma-alumina spheres, as described above, was impregnated with a dilute ammoniacal solution of chloroplatinic acid. The amount of platinum in this solution was adjusted so that the final composite contained 0.375% platinum by weight based on the dry alumina. A sufficient quantity of this platinum-alumina composite was prepared so that it could be used in the preparation of various further composites.

A 50 cc. quantity of the above prepared composite was placed as a fixed bed in a reaction tube and tested for activity for the isomerization of normal butane to isobutane. Conditions utilized included a pressure of 300 p.s.i.g., a hydrogen to hydrocarbon mol ratio of 0.5, 1.0 liquid hourly space velocity, and various temperatures. This composite is virtually inactive for the isomerization of normal butane to isobutane during two hour test periods at temperatures at 150° C., 200° C., 250° C., 300° C., and 350° C. At about 400° C., about 1.5% isobutane appears in the product.

*Example II*

A platinum-alumina composite (107.1 g.) prepared as described in Example I above was reduced in hydrogen for two hours at 600° C. and then placed as a fixed bed in a glass tube surrounded by a vertical furnace. Following this a mixture of anhydrous hydrogen chloride and hydrogen was passed through the composite at a temperature of about 600° C. for a period of about 3 hours. Following this the bottom end of the glass tube was connected to a glass flask containing 43 g. of anhydrous aluminum chloride. The temperature of the platinum-alumina composite in the tube was adjusted to 200° C. and heat applied to the glass flask containing the aluminum chloride until it began to sublime. A stream of nitrogen gas was then passed through a glass inlet tube into the glass flask to carry the aluminum chloride vapors up through the platinum-alumina composite being maintained at 200° C. This was continued for three hours after which time the aluminum chloride vapors were observed at the ascendant or top of the glass tube containing the platinum-alumina composite.

Fifteen cc. of the thus prepared composite was tested for isomerization of normal butane at the conditions hereinafter set forth, namely, 500 p.s.i.g., 1:1 hydrogen to hydrocarbon mole ratio, 4.0 liquid hourly space velocity, 40 hours total on stream time and at various temperatures. At 160° C., there was a 32 weight percent isobutane conversion; at 180° C., 48 weight percent isobutane conversion and at 200° C., 55 weight percent isobutane conversion was observed.

*Example III*

A platinum-alumina composite was prepared in a manner similar to that set forth in Example I above and was reduced in hydrogen for 2 hours at 600° C., the final composite containing 0.2% platinum. Following this the composite was placed in a glass tube and anhydrous hydrogen chloride and hydrogen was passed through said composite also at a temperature of 600° C. Following this the catalyst as a fixed bed in a glass tube was connected to a glass flask containing anhydrous aluminum chloride. The temperature was adjusted to 200° C. and the sublimed aluminum chloride passed through the catalyst composite. Following the impregnation of the composite with the sublimed aluminum chloride, said impregnation being effected by the addition of a stream of nitrogen which carried the sublimed aluminum chloride up through the composite, the composite was allowed to cool.

Fifteen cc. of the thus prepared composite was tested for isomerization of normal butane at conditions similar to that set forth in Example II above, namely, 500 p.s.i.g., 1:1 hydrogen to hydrocarbon mole ratio, 4.0 liquid hourly space velocity and at various temperatures. At 160° C., 36 weight percent isobutane conversion was noted; at 180° C., 50 weight percent isobutane conversion was observed and at 200° C., 55 weight percent isobutane conversion was observed in the product.

*Example IV*

The composite which was utilized in this example was prepared in substantially the same manner as hereinbefore described in the above examples, the only change being that palladium was used in place of platinum. The palladium-alumina composite was reduced with hydrogen at a temperature of 600° C., the composite containing 0.2% palladium. Following this the catalyst was pretreated with anhydrous hydrogen chloride and hydrogen to split out any water which was still present on the catalyst. The thus pretreated composite was then treated with aluminum chloride in a manner similar to that hereinbefore set forth and 15 cc. of catalyst was tested for activity in a manner similar to that set forth in the above examples. The conditions were identical, that is, 500 p.s.i.g., 1:1 hydrogen to hydrocarbon mole ratio, 4.0 liquid hourly space velocity and various temperatures. At 160° C., a 37 weight percent isobutane conversion was noted; at 180° C., a 52 weight percent isobutane conversion was observed and at 200° C., a 56 weight percent isobutane conversion was observed.

I claim as my invention:

1. A method for manufacturing a catalyst which comprises treating a composite of a refractory inorganic oxide support containing a platinum group metal, the platinum group metal being characterized by being in a reduced valence state, with a hydrohalide at a temperature of from about 500° to about 650° C., thereafter vaporizing a Friedel-Crafts metal halide onto said composite, and heating the thus formed composite at a temperature above 400° C. for a time sufficient to remove therefrom any unreacted Friedel-Crafts metal halide.

2. A method for manufacturing a catalyst which comprises treating a composite of alumina containing a platinum group metal, the platinum group metal being characterized by being in a reduced valence state, with a hydrohalide at a temperature of from about 500° to about 650° C., thereafter vaporizing a Friedel-Crafts metal halide onto said composite, and heating the thus formed composite at a temperature above 400° C. for a time sufficient to remove therefrom any unreacted Friedel-Crafts metal halide.

3. A method for manufacturing a catalyst which comprises treating a composite of alumina containing platinum metal, the platinum metal being characterized by being in a reduced valence state, with hydrogen chloride at a temperature of from about 500° to about 650° C., thereafter vaporizing aluminum chloride onto said composite, and heating the thus formed composite at a temperature in the range of from about 400° to about 700° C. for a time sufficient to remove therefrom any unreacted aluminum chloride.

4. A method for manufacturing a catalyst which comprises treating a composite of a refractory metal oxide containing a platinum group metal, the platinum group metal being characterized by being in a reduced valence state, with a hydrohalide at a temperature of from about 500° to about 650° C., thereafter vaporizing a Friedel-Crafts metal halide onto said composite, and heating the thus formed composite at a temperature in the range of from about 400° to about 700° C. for a time of from about 1 to about 48 hours to remove therefrom any unreacted Friedel-Crafts metal halide.

5. A method for manufacturing a catalyst which comprises treating a composite of a refractory metal oxide containing platinum metal, the platinum metal being characterized by being in a reduced valence state, with a hydrohalide at a temperature of from about 500° to about 650° C., thereafter vaporizing a Friedel-Crafts metal halide onto said composite, and heating the thus formed composite at a temperature in the range of from about 400° to about 700° C. for a time of from about 1 to about 48 hours to remove therefrom any unreacted Friedel-Crafts metal halide.

6. A method for manufacturing a catalyst which comprises treating a composite of a refractory metal oxide containing palladium metal, the palladium metal being characterized by being in a reduced valence state, with a hydrohalide at a temperature of from about 500° to about 650° C., thereafter vaporizing a Friedel-Crafts metal halide onto said composite, and heating the thus formed composite at a temperature in the range of from about 400° to about 700° C. for a time of from about 1 to about 48 hours to remove therefrom any unreacted Friedel-Crafts metal halide.

7. A method for manufacturing a catalyst which comprises treating a composite of a refractory metal oxide containing a platinum group metal, the platinum group metal being characterized by being in a reduced valence state, with hydrogen chloride at a temperature of from about 500° to about 650° C., thereafter vaporizing a Friedel-Crafts metal halide onto said composite, and heating the thus formed composite at a temperature in the range of from about 400° to about 700° C. for a time of from about 1 to about 48 hours to remove therefrom any unreacted Friedel-Crafts metal halide.

8. A method for manufacturing a catalyst which comprises treating a composite of a refractory metal oxide containing a platinum group metal, the platinum group metal being characterized by being in a reduced valence state, with hydrogen chloride at about 600° C., thereafter vaporizing a Friedel-Crafts metal halide onto said composite, and heating the thus formed composite at a temperature in the range of from about 400° to about 700° C. for a time of from about 1 to about 48 hours to remove therefrom any unreacted Friedel-Crafts metal halide.

9. A method for manufacturing a catalyst which comprises treating a composite of a refractory metal oxide containing a platinum group metal, the platinum group metal being characterized by being in a reduced valence state, with hydrogen chloride and hydrogen at about 600° C., thereafter vaporizing a Friedel-Crafts metal halide onto said composite, and heating the thus formed composite at a temperature in the range of from about 400° to about 700° C. for a time of from about 1 to about 48 hours to remove therefrom any unreacted Friedel-Crafts metal halide.

10. A method of manufacturing a catalyst which comprises treating a composite of alumina containing platinum metal, the platinum metal being characterized by being in a reduced valence state, with hydrogen chloride and hydrogen at a temperature of about 600° C., thereafter vaporizing a Friedel-Crafts metal halide onto said composite and heating the thus formed composite at a temperature in the range of from about 400° to about 700° C. for a time of from about 1 to about 48 hours to remove therefrom any unreacted Friedel-Crafts metal halide.

11. A method of manufacturing a catalyst which comprises treating a composite of alumina containing platinum metal, the platinum metal being characterized by being in a reduced valence state, with hydrogen chloride and hydrogen at a temperature of about 600° C., thereafter vaporizing a Friedel-Crafts aluminum halide onto said composite and heating the thus formed composite at a temperature in the range of from about 400° to about 700° C. for a time of from about 1 to about 48 hours to remove therefrom any unreacted Friedel-Crafts aluminum halide.

12. A method of manufacturing a catalyst which comprises treating a composite of alumina containing platinum metal, the platinum metal being characterized by being in a reduced valence state, with hydrogen chloride and hydrogen at a temperature of about 600° C., thereafter vaporizing anhydrous aluminum chloride onto said composite and heating the thus formed composite at a temperature in the range of from about 400° to about 700° C. for a time of from about 1 to about 48 hours to remove therefrom any unreacted Friedel-Crafts anhydrous aluminum chloride.

13. A method of manufacturing a catalyst which comprises treating a composite of alumina containing platinum metal, the platinum metal being characterized by being in a reduced valence state, with hydrogen chloride and hydrogen at a temperature of about 600° C., thereafter vaporizing anhydrous aluminum bromide onto said composite and heating the thus formed composite at a temperature in the range of from about 400° to about 700° C. for a time of from about 1 to about 48 hours to remove therefrom any unreacted Friedel-Crafts anhydrous aluminum bromide.

14. A method of manufacturing a catalyst which comprises treating a composite of alumina containing platinum metal, the platinum metal being characterized by being in a reduced valence state, with hydrogen chloride and hydrogen at a temperature of about 600° C., thereafter contacting said composite with vapors of anhydrous aluminum chloride at a temperature in the range of from about 400° to about 700° C. for a time of from about 1 to about 48 hours, whereby simultaneous reaction of the aluminum chloride with said composite and heating of the resultant composite to remove unreacted aluminum chloride is accomplished as a single step.

15. A method of manufacturing a catalyst which comprises treating a composite of alumina containing platinum metal, the platinum metal being characterized by being in a reduced valence state, with hydrogen chloride and hydrogen at a temperature of about 600° C., thereafter contacting said composite with vapors of anhydrous aluminum bromide at a temperature in the range of from about 400° to about 700° C. for a time of from about 1 to about 48 hours, whereby simultaneous reaction of the aluminum bromide with said composite and heating of the resultant composite to remove unreacted aluminum bromide is accomplished as a single step.

16. A method for manufacturing a catalyst which comprises treating a composite of alumina containing platinum with a hydrogen-containing gas at conditions to convert the platinum into a reduced valence state, thereafter treatment said composite with hydrogen chloride at a temperature of about 600° C., and contacting vapors of aluminum chloride with said composite at a temperature of from about 400° to about 700° C. for a time of from about 1 to about 48 hours, whereby simultaneous reaction of the aluminum chloride with said composite and heating of the resultant composite to remove unreacted aluminum chloride is accomplished as a single step.

17. A method for manufacturing a catalyst which comprises treating a composite of alumina containing platinum with a hydrogen-containing gas at conditions to convert the platinum into a reduced valence state, thereafter treating said composite with hydrogen chloride at a temperature of about 600° C., and contacting vapors of aluminum chloride with said composite at a temperature of from about 400° to about 700° C. for a time of from about 1 to about 48 hours, whereby simultaneous reaction of the aluminum chloride with said composite and heating of the resultant composite to remove unreacted aluminum chloride is accomplished as a single step.

18. A method for manufacturing a catalyst which comprises treating a composite of alumina containing platinum with a hydrogen-containing gas at conditions to convert the platinum into a reduced valence state, thereafter treating said composite with hydrogen chloride and hydrogen at a temperature of about 600° C., and contacting vapors of aluminum chloride with said composite at a temperature of from about 400° to about 700° C. for a time of from about 1 to about 48 hours, whereby simultaneous reaction of the aluminum chloride with said composite and heating of the resultant composite to remove unreacted aluminum chloride is accomplished as a single step.

References Cited in the file of this patent

UNITED STATES PATENTS

| | | |
|---|---|---|
| 2,818,393 | Lefrancois et al. | Dec. 31, 1957 |
| 2,841,626 | Holzman et al. | July 1, 1958 |
| 2,861,959 | Thorn et al. | Nov. 25, 1958 |
| 2,900,425 | Bloch et al. | Aug. 18, 1959 |